(12) United States Patent
Oldenzijl et al.

(10) Patent No.: US 7,569,160 B2
(45) Date of Patent: Aug. 4, 2009

(54) ELECTRICALLY CONDUCTIVE UV-CURABLE INK

(75) Inventors: Rudie Oldenzijl, Hoogezand (NL); Corina Prent, Steenwijk (NL)

(73) Assignee: Henkel AG & Co. KGaA, Düsseldorf (DE)

( * ) Notice: Subject to any disclaimer, the term of this patent is extended or adjusted under 35 U.S.C. 154(b) by 20 days.

(21) Appl. No.: 11/733,279

(22) Filed: Apr. 10, 2007

(65) Prior Publication Data
US 2008/0250972 A1 Oct. 16, 2008

(51) Int. Cl.
*H01B 1/00* (2006.01)
*H01B 1/12* (2006.01)
*H01B 1/22* (2006.01)

(52) U.S. Cl. .................. 252/500; 252/502; 252/513; 252/514; 252/520.1; 524/403

(58) Field of Classification Search ............. 252/500, 252/502.513, 514, 520.1; 524/403
See application file for complete search history.

(56) References Cited

U.S. PATENT DOCUMENTS

| | | | | |
|---|---|---|---|---|
| 4,959,178 A | * | 9/1990 | Frentzel et al. | 252/514 |
| 4,999,136 A | * | 3/1991 | Su et al. | 252/512 |
| 5,093,038 A | * | 3/1992 | Durand | 252/514 |
| 5,707,554 A | * | 1/1998 | Bennett et al. | 252/500 |
| 6,261,645 B1 | * | 7/2001 | Betz et al. | 427/500 |
| 6,290,881 B1 | | 9/2001 | Krohn | |
| 6,905,637 B2 | * | 6/2005 | Yeager et al. | 252/511 |
| 2002/0022130 A1 | * | 2/2002 | Kohl et al. | 428/423.1 |
| 2002/0121631 A1 | * | 9/2002 | Rahman et al. | 252/500 |
| 2007/0128365 A1 | * | 6/2007 | Koch et al. | 427/299 |

FOREIGN PATENT DOCUMENTS

| | | | |
|---|---|---|---|
| GB | 2407094 A | * | 4/2005 |
| WO | WO9967794 | | 9/1990 |

* cited by examiner

*Primary Examiner*—Mark Kopec
*Assistant Examiner*—Jaison P Thomas

(57) ABSTRACT

An ultraviolet or electron beam curable conductive material for use in the electronics industry. The conductive material has a low viscosity and is capable of application to a substrate by high speed printing techniques such as flexography and rotogravure and provides high electrical conductivity following cure. The conductive material comprises one or more oligomers, one or more acrylate carriers, one or more reactive monomers such as vinyl ether, conductive filler and one or more photoinitiators. Optional additional ingredients, such as diluents, dispersants, etc. may be added as desired.

19 Claims, No Drawings

ELECTRICALLY CONDUCTIVE UV-CURABLE INK

FIELD OF THE INVENTION

The present invention is related to ultraviolet-curable electrically conductive inks.

BACKGROUND OF THE INVENTION

New applications requiring printed conductive materials are continuously arising in the electronics industry. Some of the newly developing applications are printed antennas for radio frequency identification ("RFID") tags, printed transistors and solar cells. Such applications, along with much of the electronics market, are driven by cost and speed of assembly. Consequently, conductive materials are required that are capable of high throughput. High throughput is epitomized by high speed printing techniques such as flexography and rotogravure which are increasingly utilized instead of the slower screen printing process. For example, production speeds of up to about 400 meters per minute may be achieved through the high speed printing techniques, as opposed to speeds in the range of about 60 meters per minute via rotary screen printing. As such high speed techniques are becoming increasingly common in the packaging, consumer and publication industries, conductive materials must be adapted to have the proper rheological properties to be utilized at such high speeds.

Commercially available electrically conductive materials have traditionally been in the form of polymer thick films ("PTFs"). These PTFs are generally high viscosity materials that are applied to a substrate by screen printing to form electronic circuits in items such as membrane keyboards, printed circuit boards and heating elements. Most PTFs consist of a resin either in solvent or dispersed/dissolved in water along with conductive filler, with silver being the preferred filler for most high conductivity applications. After application the water or solvent is evaporated through drying or curing and the conductive filler forms interparticle contacts to create a conductive network. In addition to the solvent and waterbased systems, ultraviolet ("UV") curable PTFs are commercially available. Such UV curable PTFs generate conductivity by curing the film with UV or electron beam ("EB") radiation after application. UV curable materials generally cure at ambient temperatures and at a faster rate than thermally cured materials. UV curable materials have a further advantage in that the release of environmentally harmful substances is minimized during curing.

Accordingly, it would be advantageous to provide a conductive material that is capable of UV curing with rheological properties that are amenable to high speed printing techniques, such as flexography and rotogravure.

SUMMARY OF THE INVENTION

The present invention is directed to a UV/EB curable conductive material for use in the electronics industry. The conductive material has a low viscosity and is capable of application by high speed printing techniques such as flexography and rotogravure and provides high electrical conductivity following cure. The conductive material comprises one or more oligomers, one or more acrylate carriers, one or more reactive monomers such as vinyl ether, conductive filler and one or more photoinitiators. Optional additional ingredients, such as leveling agents, diluents, dispersants, etc. may be added as desired.

DETAILED DESCRIPTION OF THE PREFERRED EMBODIMENTS

Conductive materials have many uses in various electronics applications. High volume applications, such as RFID tags, require high speed production which creates unique demands on the conductive materials. For such application, the conductive materials must have a low viscosity and be capable of curing in a very short time. The present invention provides a low viscosity UV curable conductive ink that is capable of being utilized in high speed, high volume electronics applications. The ink comprises one or more oligomers, such as unsaturated chlorinated polyester polymer, dissolved in an acrylate carrier, one or more reactive monomers such as vinyl ether, conductive filler and one or more photoinitiators. Optional ingredients may be included as desired. The viscosity of the ink is in the range of about 1000 mPa·s to about 3000 mPa·s to optimize its use in high speed printing processes.

One or more oligomers may be utilized in the conductive composition. Exemplary oligomers include but are not limited to unsaturated chlorinated polyester, epoxy acrylates, polyester acrylates, urethane acrylates, polyether acrylates and mixtures thereof. The preferred oligomer is chlorinated polyester polymer. The oligomers comprise in the range of about 5 to about 20 weight percent of the composition, and preferably in the range of about 5 to about 15 weight percent of the composition.

The oligomer is dissolved in an acrylate carrier. Among the acrylate carriers that may be utilized are triacrylates, such as trimethylolpropane triacrylate, diacrylates and tetraacrylates and mixtures thereof. Suitable commercially available chlorinated polyester oligomers dissolved in acrylates are CN736, CN738, CN750, commercially available from Sartomer; chlorinated polyester resin dissolved in trimethylolpropane triacrylate, commercially available as Genomer 6050 TM from Rahn, Ebecryl 436, and Ebecryl 586 commercially available from Cytec, and EC6314C-60, commercially available from IGM resins; chlorinated polyester in propoxylated glycerol triacrylate, commercially available from Cytec as Ebecryl 436; and chlorinated polyester in hexandioldiacrylate, commercially available as Ebecryl 584 from Cytec; and mixtures thereof. The acrylate carrier comprises in the range of about 0.1 to about 5 weight percent of the composition and in one embodiment in the range of about 2.5 to about 3.5 weight percent of the composition.

The reactive monomer utilized should react with the oligomers and provide low viscosity to the composition after curing. Exemplary monomers include but are not limited to vinylethers, such as hydroxybutylvinylether, triethyleneglycol divinylether, cyclohexanedimethanoldivinylether, dodecylvinylether, cyclohexylvinylether, diethyleneglycoldivinylether, 2-ethylhexyl vinylether, dipropyleneglycol divinylether, hexanediol divinylether, butanediol divinylether, 1-vinyl-2-pyrrolidone, n-vinyl-2-caprolactam commercially available from ISP-International, acryloylmorhpoline, commercially available from Rahn and mixtures thereof. The preferred diluent is hydroxybutylvinylether. The reactive monomer comprises in the range of about 5 to about 20 weight percent of the composition, and preferably in the range of about 5 to about 15 weight percent of the composition.

One or more conductive fillers are utilized in the composition. Exemplary conductive fillers include, but are not limited to, silver, copper, gold, palladium, platinum, nickel, gold or silver-coated nickel, carbon black, carbon fiber, graphite, aluminum, indium tin oxide, silver coated copper, silver coated aluminum, metallic coated glass spheres, metallic coated filler, metallic coated polymers, silver coated fiber, silver coated spheres, antimony doped tin oxide, conductive nanospheres, nano silver, nano aluminum, nano copper, nano nickel, carbon nanotubes and mixtures thereof. In one embodiment the conductive filler is a mixture of different size silver flakes, such as a mixture of SF-80, commercially available from Ferro, and SF-AA0101, commercially available from Metalor. The one or more conductive fillers comprise in the range of about 40 to about 80 weight percent of the composition and preferably in the range of about 30 to about 50 weight percent of the composition.

One or more photoinitiators are included in the composition to initiate the crosslinking of the material. The photoinitiators may be either free radical or cationic in nature, or a combination of both. Exemplary photoinitiators include, but are not limited to 1-hydroxy-cyclohexyl-phenylketone; 2-hydroxy-2-methyl-1-phenyl-1-propanone; 2-hydroxy-1-[4-(2-hydroxyethoxy)phenyl]-2-methyl-1-propanone; alpha,alpha-dimethoxy-alpha-phenylacetophenone; 2-benzyl-2-(dimethylamino)-1-[4(4-morpholinyl)-1-butanone); 2-methyl-1-[4-(methylthio)phenyl]-2-(4-morpholinyl)-1-propanone, diphenyl(2,4,6-trimethylbenzoyl)-phosphine oxide; phosphine oxide, phenyl bis(2,4,6-trimethyl benzoyl); phosphine oxide; iodonium; (4-methylphenyl)[4-(2-methylpropyl)phenyl]-hexafluorophosphate, commercially available under the IRGACURE or DAROCUR trademarks from Ciba Specialty Chemicals; mixed arylsulfonium hexafluoroantimonate salts; mixed arylsulfonium hexofluorophosphate salts, commercially available under the CYRACURE trademark from Dow Chemical; benzophenone; 4-phenyl benzophenone; 4-methyl benzophenone; 2-isopropyl thioxanthone; 2-chlorothioxanthone; 2,4-diethylthioxanthone; commercially available under the OMNIRAD trademark from IGM resins, and mixtures thereof. Certain photoinitiators which are more effective in combination with amines include, but are not limited to, 2-dimethylamino-ethylbenzoate; ethyl-4-(dimethylamino)benzoate; 2-ethyl-4-(dimethylamino)benzoate; isoamyl 4-(N,N-dimethylamino)benzoate; commercially available from under the OMNIRAD trademark from IGM resins, and mixtures thereof. The one or more photoinitiators comprise in the range of about 0.1 to about 5 weight percent of the composition and preferably in the range of about 0.1 to about 1.5 weight percent of the composition.

In one embodiment the composition includes one or more leveling agents or dispersants. Exemplary leveling agents and dispersants include, but are not limited to acrylate copolymers, such as Byk-359 and Byk-361 commercially available from Byk Chemie; polyether modified polydimethylsiloxane, commercially available as Byk-UV 3510; polyether modified dimethylsiloxane, commercially available as Byk-UV 3530; polyurethane derivative or modified polyurethane, commercially available as Texaphor P60 or Texaphor P63 from Cognis; solvent-free anionic aliphatic ester, commercially available as Texaphor UV 20; modified polyurethane dispersant, commercially available as Texaphor SF73; monofunctional oleo alkylene oxide block copolymer, commercially available as Hydropalat 1080; polymeric dispersant, commercially available as Hydropalat 3275, all commercially available from Cognis; polymeric dispersant commercially available as Solsperse 39000; polyether amido acid polyamine derivative, commercially available as Solsperse 71000 form Noveon; polyacrylate and polyurethane, commercially available from Ciba Specialty Chemicals and mixtures thereof. The leveling agent acts to reduce the viscosity of the composition to enhance its use in high speed applications. The one or more leveling agents comprise in the range of about 0.1 to about 5 weight percent of the composition and preferably in the range of about 0.1 to about 1.5 weight percent of the composition.

Various optional additives may be included as desired such as surface active agents, surfactants, wetting agents, antioxidants, thixotropes, reinforcement materials, silane functional perluoroether, phosphate functional perfluoroether, silanes, titanates, wax, phenol formaldehyde, air release agents, flow additives, adhesion promoters, rheology modifiers, surfactants, spacer beads and mixtures thereof. The ingredients are specifically chosen to obtain the desired balance of properties for the use of the resins utilized in the particular composition.

The invention can be further described by the following non-limiting examples.

EXAMPLE 1

A conductive ink material was produced by the process of mixing chlorinated polyester oligomer and vinylether at 2.6 m/s with a propeller mixer until homogeneous. Next the photoinitiator and the leveling agent were added and mixed until homogeneous. All silver was gently added and subsequently the formulation was mixed for 5 minutes at 9.9 m/s.

The composition of the ink is shown in Table 1.

TABLE 1

Ink Composition

| Ingredient | Weight Percent |
|---|---|
| Hydroxybutylvinylether | 8.2 |
| Unsaturated chlorinated polyester dissolved in trifunctional acrylate[1] | 8.2 |
| Silver Flake[2] | 82.5 |
| Photoinitiator[3] | 0.4 |
| Leveling Agent[4] | 0.7 |

[1]CN376
[2]Mixture of SF-80 and SF-AA0101
[3]OMNIRAD DETX
[4]Byk UV-3510

The resulting conductive ink material was printed using the rotogravure process on a polyester (Melinex ST506) substrate and exposed to a curing dose of UV radiation of about 1700 mJ/cm$^2$ which was provided by a mercury bulb. Best results were obtained with a 54 l/cm anilox, with a cell volume of 18.05 ml/m$^2$. Following UV cure the conductive ink provided a resistance of about 0.63 Ohm over a track of 5 by 1 cm at a thickness of 5 micron or 0.13 Ohm/□ at 5 micron thickness which equals a resistance of 6.25E-05 Ω.cm. Further curing by additional heating to a temperature of about 150° C. for 30 seconds resulted in the resistance lowering to about 0.40 Ohm over a track of 5 by 1 cm at 5 micron thickness or a resistance of 4E-05 Ω.cm.

EXAMPLE 2

A conductive ink material was produced by the process of Example 1.

TABLE 2

Ink Composition

| Ingredient | Weight Percent |
|---|---|
| Hydroxybutylvinylether | 10.0 |
| Unsaturated chlorinated polyester oligomer[1] | 8.0 |

TABLE 2-continued

Ink Composition

| Ingredient | Weight Percent |
| --- | --- |
| 2-Phenoxy ethylacrylate[2] | 0.5 |
| Silver Flake[3] | 80.2 |
| Photoinitiator[4] | 0.6 |
| Leveling Agent[5] | 0.7 |

[1]CN376
[2]SR339
[3]Mixture of SF-80 and SF-AA0101
[4]Mixture of OMNIRAD DETX and IRGACURE 2100
[5]Byk UV-3510

The resulting conductive ink material was printed using the flexography process (anilox: 100 l/cm, 15.8 ml/m$^2$) on a polyester GAG substrate and exposed to a curing dose of UV radiation which was provided by a Mercury UV bulb. Following UV cure the conductive ink provided a resistance of about 1.25E-04 Ω.cm. The conductive ink was further cured by additional heating to a temperature of 150° C. for 30 seconds which resulted in the resistance lowering to about 6.75E-05 Ω.cm. During trials on an industrial flexo press, several antenna designs were printed. Chips were mounted on the antennas and reading distances for the signals were measured. Depending on the type of anilox used, the type of substrate and the time of post heating, reading distances between 2 and 4 meters were obtained.

Many modifications and variations of this invention can be made without departing from its sprit and scope, as will be apparent to those skilled in the art. The specific embodiments described herein are offered by way of examples only, and the invention is to be limited only by the terms of the appended claims, along with the full scope and equivalents to which such claims are entitled.

We claim:

1. A composition comprising one or more chlorinated polyester oligomers, one or more acrylate carriers, hydroxybutylvinylether, one or more conductive fillers and one or more photoinitiators.

2. The composition of claim 1, further comprising one or more leveling agents.

3. The composition of claim 2, wherein the one or more leveling agents are selected from the group consisting of acrylate copolymers; polyether modified polydimethylsiloxane; polyether modified dimethylsiloxane; polyurethane derivative or modified polyurethane; solvent-free anionic aliphatic ester; modified polyurethane dispersant; monofunctional oleo alkylene oxide block copolymer; polymeric dispersant; polyether amido acid polyamine derivative; polyacrylate and polyurethane, and mixtures thereof.

4. The composition of claim 2, wherein the leveling agent comprises in the range of about 0.1 to about 5 weight percent of the composition.

5. The composition of claim 4, wherein the leveling agent comprises in the range of about 0.1 to about 1.5 weight percent of the composition.

6. The composition of claim 1, wherein the one or more acrylate carriers is selected from the group consisting of diacrylates, triacrylates, tetraacrylates and mixtures thereof.

7. The composition of claim 6, wherein the acrylate carrier is trimethylolpropane triacrylate.

8. The composition of claim 1, wherein the conductive filler is silver flakes.

9. The composition of claim 1, wherein the photoinitiator is chosen from the group consisting of 1-hydroxy-cyclohexyl-phenylketone; 2-hydroxy-2-methyl-1-phenyl-1-propanone; 2-hydroxy-1-[4-(2-hydroxyethoxy)phenyl]-2-methyl-1-propanone; alpha, alpha-dimethoxy-alpha-phenylacetophenone; 2-benzyl-2-(dimethylamino)-1-[4(4-morpholinyl)-1-butanone; 2-methyl-1-[4-(methylthio)phenyl]-2-(4-morpholinyl)-1-propanone; diphenyl(2,4,6-trimethylbenzoyl)-phosphine oxide; phosphine oxide, phenyl bis(2,4,6-trimethyl benzoyl; phosphine oxide; Iodonium; 4-methylphenyl[4-(2-methylpropyl) phenyl]-hexafluorophosphate; mixed arylsulfonium hexafluoroantimonate salts; mixed arylsulfonium hexafluorophosphate salts, benzophenone; 4-phenyl benzophenone; 4-methyl benzophenone; 2-isopropyl thioxanthone; 2-chlorothioxanthone; 2,4-diethylthioxanthone; 2-dimethylamino-ethylbenzoate; ethyl-4-(dimethylamino) benzoate; 2-ethyl-4-(dimethylamino)benzoate; isoamyl 4-(N,N-dimethylamino)benzoate and mixtures thereof.

10. The composition of claim 1, wherein the oligomers comprise in the range of about 5 to about 20 weight percent of the composition.

11. The composition of claim 10 wherein the oligomers comprise in the range of about 5 to about 15 weight percent of the composition.

12. The composition of claim 1, wherein the acrylate carrier comprises in the range of about 0.1 to about 5 weight percent of the composition.

13. The composition of claim 12, wherein the acrylate carrier comprises in the range of about 0.1 to about 1.5 weight percent of the composition.

14. The composition of claim 1, wherein the reactive monomer comprises in the range of about 5 to about 20 weight percent of the composition.

15. The composition of claim 14, wherein the reactive monomer comprises in the range of about 5 to about 15 weight percent of the composition.

16. The composition of claim 1, wherein the conductive filler comprises in the range of about 40 to about 80 weight percent of the composition.

17. The composition of claim 16, wherein the conductive filler comprises in the range of about 30 to about 50 weight percent of the composition.

18. The composition of claim 1, wherein the photoinitiator comprises in the range of about 0.1 to about 5 weight percent of the composition.

19. The composition of claim 18, wherein the photoinitiator comprises in the range of about 0.1 to about 1.5 weight percent of the composition.

* * * * *